H. W. ASH.
HEATING AND MIXING PLANT.
APPLICATION FILED OCT. 18, 1910.

1,067,210.

Patented July 8, 1913.
6 SHEETS—SHEET 1.

H. W. ASH.
HEATING AND MIXING PLANT.
APPLICATION FILED OCT. 18, 1910.

1,067,210.

Patented July 8, 1913.
6 SHEETS—SHEET 6.

WITNESSES:
M. E. Flaherty.
George Langton.

INVENTOR:
Horace W. Ash
By
his attorneys.

UNITED STATES PATENT OFFICE.

HORACE W. ASH, OF WINCHESTER, MASSACHUSETTS, ASSIGNOR TO WARREN BROTHERS COMPANY, OF CHARLESTON, WEST VIRGINIA, A CORPORATION OF WEST VIRGINIA.

HEATING AND MIXING PLANT.

1,067,210.  Specification of Letters Patent.  Patented July 8, 1913.

Application filed October 18, 1910. Serial No. 587,707.

*To all whom it may concern:*

Be it known that I, HORACE W. ASH, of Winchester, in the county of Middlesex and State of Massachusetts, a citizen of the United States, have invented a new and useful Improvement in Heating and Mixing Plants, of which the following is a specification.

My invention relates to a heating and mixing plant and more particularly to a plant for heating the mineral ingredients for bituminous pavements and for mixing them with the bituminous cement.

It comprises a rotary drying and mixing drum, means for supplying it with heat; for feeding the mineral and bituminous components to it; for intermingling the contents of one end of the cylinder with that of the other and for discharging the mixed ingredients after the operation is complete.

The usual apparatus for heating and mixing bituminous mixtures for street pavements of this type do not have positive means for intermingling the contents of one portion of the drum with that of other portions of the drum and as a result the resulting mixture varies to a very great extent, both as to the percentage of the bituminous cement in the different portions of the same batch, and also as to the relative proportions of the different sized particles of the mineral ingredients in different portions of the batch. Moreover the temperature varies in different portions of the batch so that the batch is not uniform in any way. To obviate these disadvantages I provide for a means of conveying the contents of the revolving cylinder from the receiving opening toward the discharge opening which may also serve to mix the mineral particles thoroughly so that they are uniformly heated or coated as the case may be, and an independent means of conveying the material back toward the feed opening at a different rate of speed.

My invention also provides a conveying means attached to the interior of the shell or device which may be always covered with material at the bottom of the drum so that the whole contents of the drum does not move forward at the same rate; the portion below the top of the conveyer being carried forward by it, while that on top rolls back and becomes intermingled with the material behind it.

Figure 1:
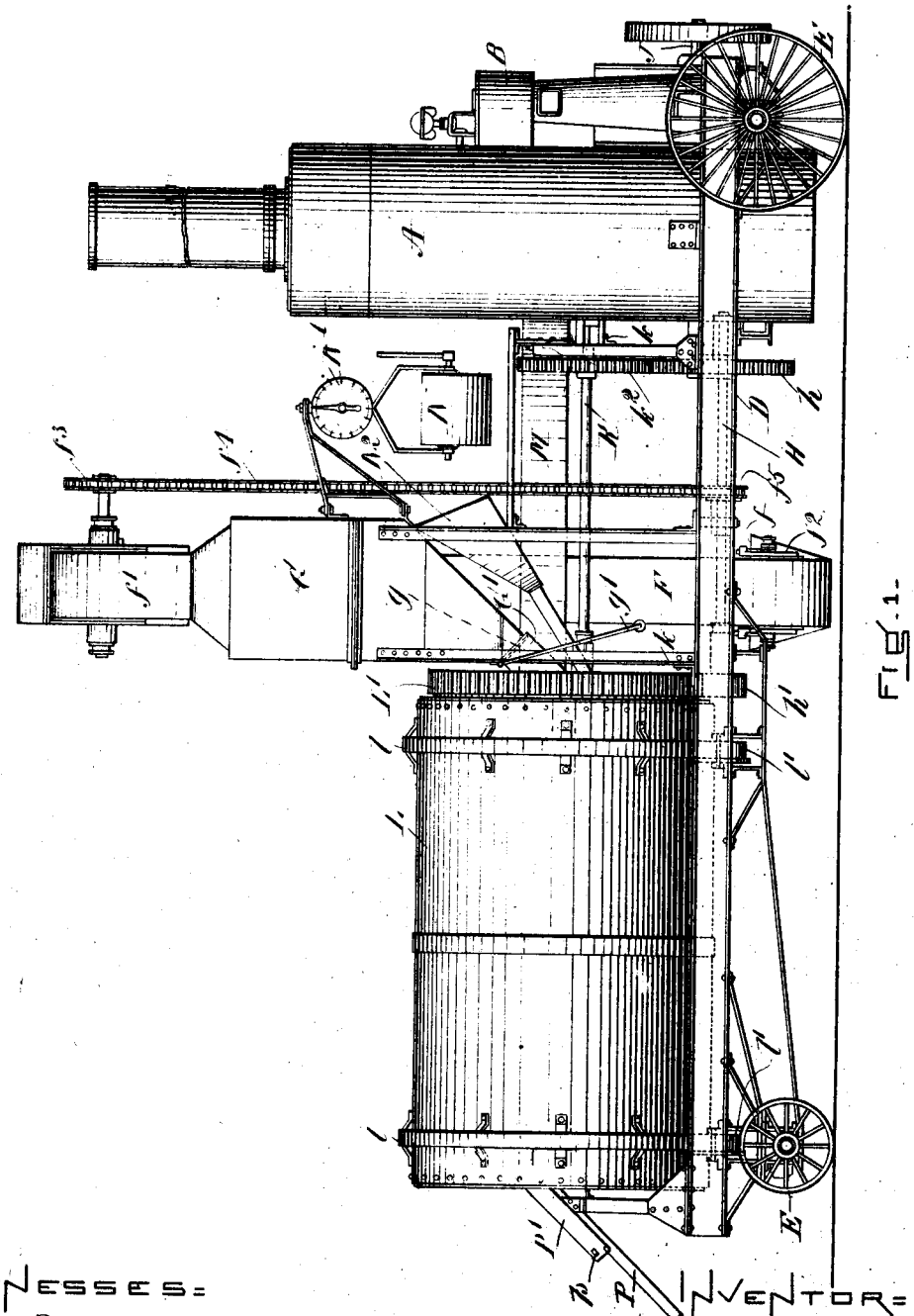
Figure 2:
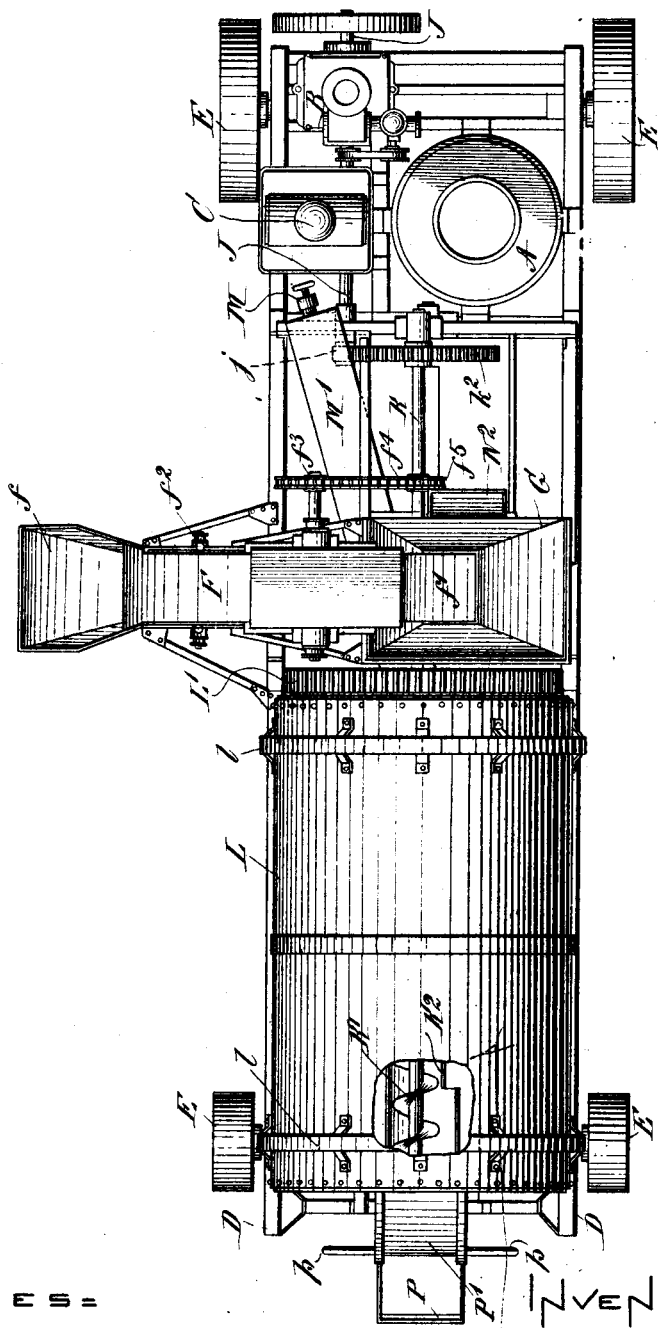
Figure 3:
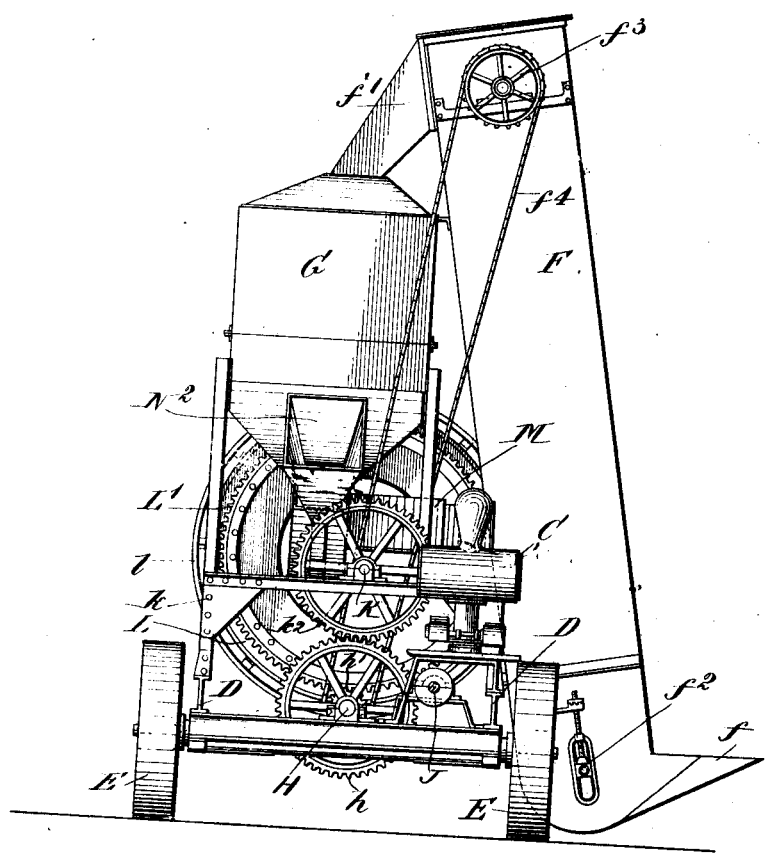
Figure 4:
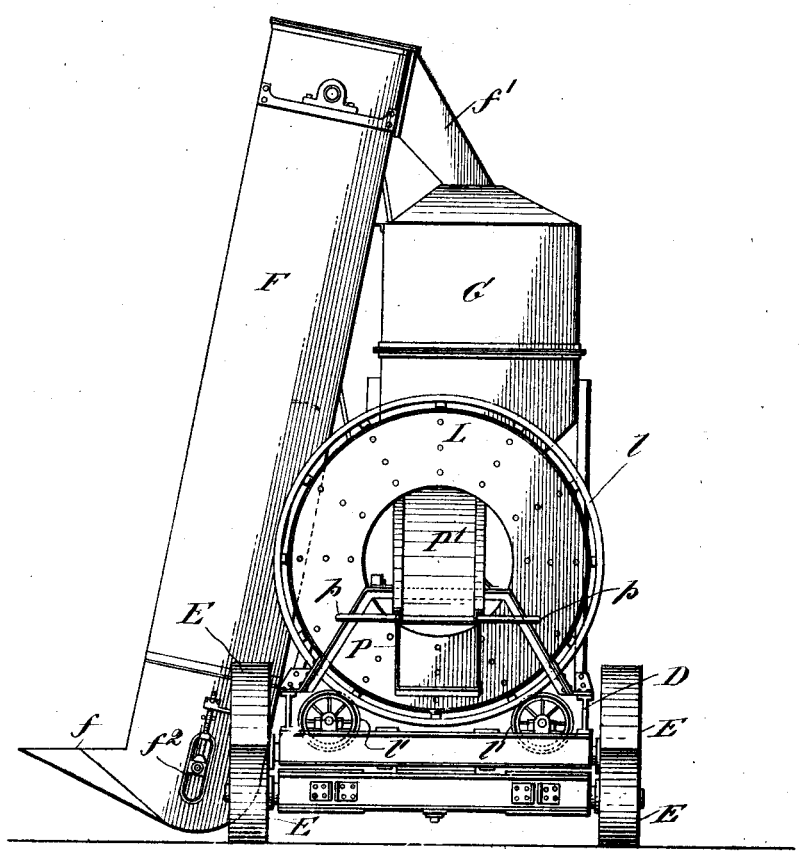
Figure 5:
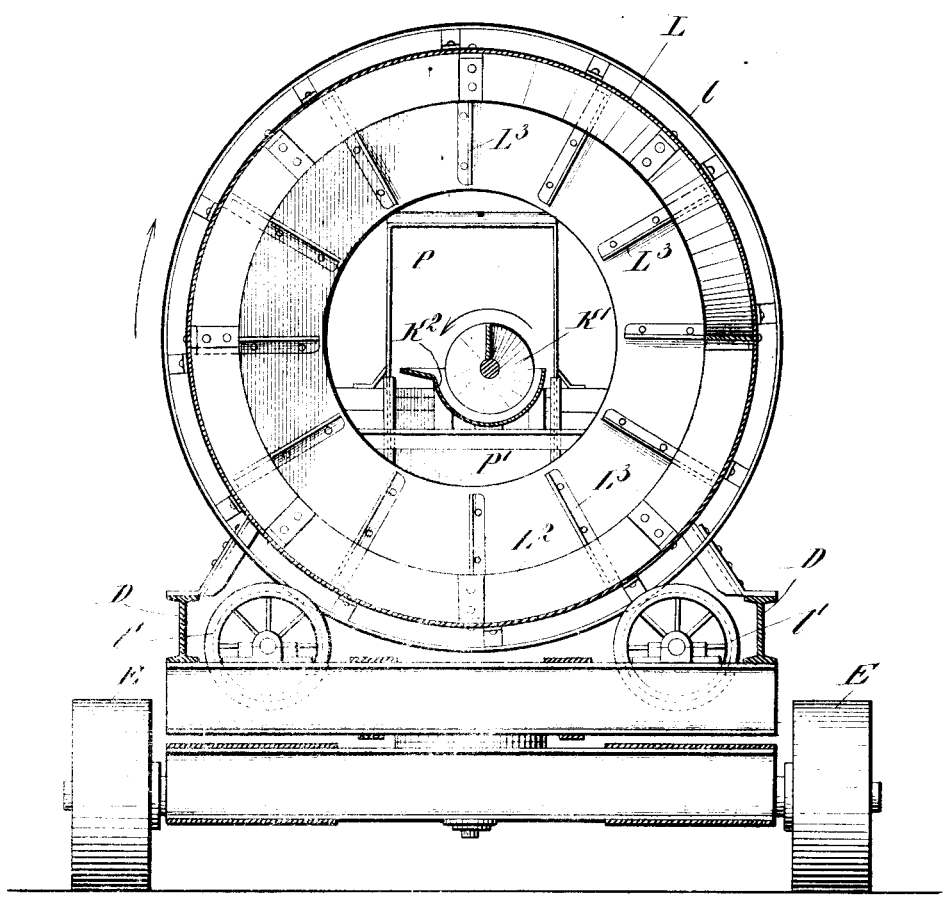
Figure 6:
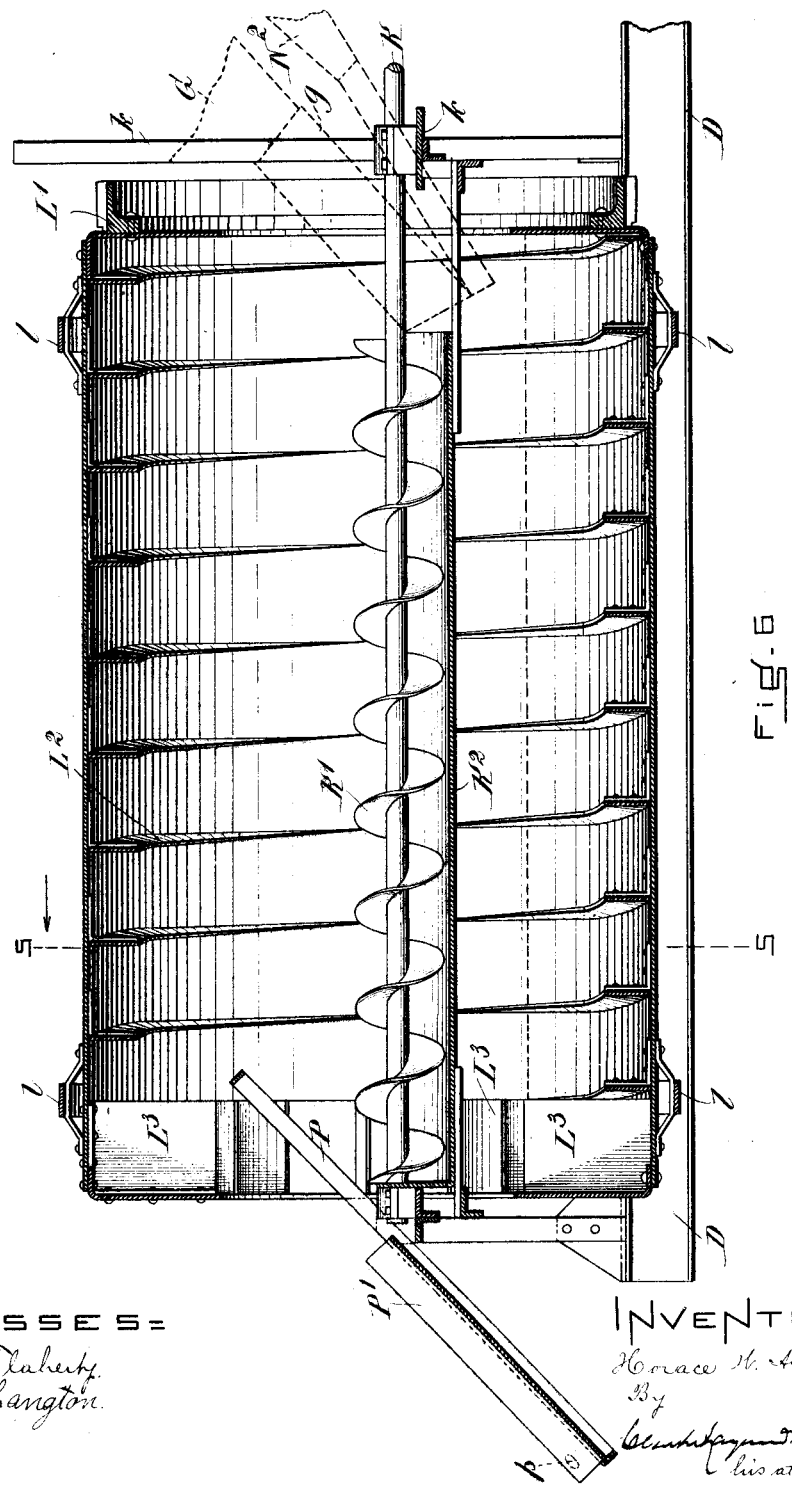

I will now describe the invention in detail in connection with the drawings forming a part of the specification:

In the drawings:—Figure 1 is a side elevation of a machine embodying my invention, Fig. 2 being a plan view thereof, omitting the cement bucket and weigher, a portion of the top of the drum being broken away. Fig. 3 is a front elevation and Fig. 4 is a rear elevation, the boiler and engine being removed. Fig. 5 is a vertical section across the drum on line 5—5 of Fig. 6, and Fig. 6 is a vertical longitudinal section of the drum showing one of the beams on which the drum is supported, these two views being on an enlarged scale.

A is a boiler of ordinary construction supplying steam by means of which the engine B and the oil pump C are operated. For convenience of moving I prefer to mount the boiler and the rest of the mechanism on a rectangular frame D which in turn is mounted on traction wheels E in any convenient way.

F is the exterior of a conveyer chamber. The conveyer and its inclosure may be of any suitable construction of bucket conveyer adapted to raise the stones which are to form the mineral aggregate of the pavement, the material for which is to be prepared by this machine. Such conveyers are well known in the art and need not be described except to say that $f$ is the hopper through which stone is fed to the conveyer; $f^1$ is the delivery tube by means of which the stones are directed from the top of the conveyer into a bin G and $f^2$ is a belt tightener by means of which any slack in the conveyer belt may be taken up.

$f^3$ is a sprocket wheel on a shaft which carries the upper end of the conveyer. Power is applied to this sprocket wheel $f^3$ by means of a chain $f^4$ which also runs over a sprocket wheel $f^5$ on the shaft H. Power is applied to this shaft from the main shaft J of the engine B by means of the pinion $j$, on shaft J and gear $h$ mounted on the shaft H.

L is the drum the exterior of which is cylindrical and which carries tracks $l$ which run on trunnion wheels $l^1$. This drum L also carries a gear $L^1$ which is in mesh with a pinion $h^1$ on shaft H so that the rotation of the shaft H also causes the rotation of the drum L.

Supports $k$ are mounted on the frame D carrying bearings $k^1$ for the shaft K. This shaft carries at one end the gear $k^2$ which is in mesh with the gear $h$ from which it receives power. The shaft K passes through the drum L and carries a spiral conveyer $K^1$ so that the rotation of the shaft K operates this conveyer. This spiral conveyer $K^1$ lies in a trough $K^2$ which runs nearly the length of the drum as shown in Fig. 6.

The drum is provided with a spiral conveyer $L^2$ attached to its interior peripheral surface, that is, a continuous spiral shelf which begins at the inlet of the drum and ends near its farther end. The purpose of this spiral conveyer is to convey the material which is fed into the drum from its entrance toward its outlet. Near its outlet the interior of the drum is provided with a series of trays $L^3$ arranged so that the material fed or conveyed by means of the said spiral conveyer will be dropped onto these trays and carried off from them into the trough $K^2$ so that they will be returned by the conveyer $K^1$ to the entrance end of the drum again. It will be noted that the central and peripheral conveyers rotate in opposite directions and that the speed of the central conveyer will be more rapid than that of the peripheral conveyer.

In practice I prefer so to proportion the size of the drum to the amount of material to be mixed that when the drum contains its normal load the peripheral conveyer in the bottom of the drum will be covered by the material as is indicated by the dotted line in Fig. 6. The advantage of this is that the conveyer $L^2$ will feed so much of the material as it engages (see Fig. 6). So much of the material as lies above the conveyer will tend to fall back over the conveyer and the material as a whole will thus become more thoroughly mixed than if the depth of material were less and it were merely fed from one end of the drum to the other without intermingling.

The bin G is provided with a suitable gate (not shown) and from its lower end runs a spout $G^1$ which enters a properly proportioned opening at the inlet end of the drum (see Fig. 4), so that upon opening the gate the entire contents or so much of the contents of the bin as is desired will be fed into the drum. For the purpose of drying the contents of the drum I prefer to provide an oil burner M of any ordinary construction, preferably one under a heavy draft, so that a flame from this burner will project into the drum, and to direct its course I provide a flue $M^1$ preferably lined with firebrick, the farther end of which projects into the interior of the drum L. In this flue the oil is gasified and combustion is partially completed before the gases enter the drum. The pump C serves to provide a fuel under sufficient pressure or draft to throw considerable flame and heat into the interior of the drum, sufficient in a short time to dry the contents of the drum.

In addition to the above described mechanism I have shown a kettle N and weighing mechanism $N^1$ by means of which a proper amount of bituminous cement or other like material may be weighed and then dumped into a suitable trough $N^2$ which shall lead it into the interior of the drum. In addition, also, I provide means such as an adjustable trough by which the drum shall be emptied. For this purpose there is shown at P ways upon which slides a trough $P^1$, $p$, $p$ being handles attached to the trough by means of which its position may be changed. As shown in Fig. 6 the trough $P^1$ is in its inoperative position. In Fig. 1 it is in operative position so that the contents of the trays $L^3$ will drop upon it and be directed to a cart or other suitable receptacle outside the drum instead of falling upon the trough $K^2$.

In the operation of my machine stones of proper grades are fed into the hopper $f$ and by means of the conveyer contained within the casing F are conveyed to the top of the casing and there fed through the trough $f^1$ into the bin G; the engine being first started so that the moving parts are set in motion and the pump operated. The fuel at M is lighted and the pump supplying fuel and draft forces the flame well into the interior of the drum L. The gate of the bin is then opened and the contents falls on the trough $G^1$ and from it into the interior of the drum L which is then rotating. The rotation of the drum gradually feeds the material along by means of the peripheral conveyer $L^2$ until the farther end is reached when the material is fed onto the trays $L^3$ and dropped into the trough $K^2$. By means of the axial conveyer $K^1$ which rotates in the opposite direction from the drum the stones are fed to the entrance to the drum again and fall over so as to be again reached and moved by the peripheral conveyer $L^2$. It is understood that for the best results the drum is intended to receive a depth of stone greater than the width of the peripheral conveyer so that while this process is going on a portion only of the stone is fed, the rest falling back over the conveyer and gradually working its way between the conveyers to be fed in its turn. During all this time the flame is creating a strong drying temperature within the drum so that the stones as they are constantly presented to the drying action of the air or flame are thoroughly dried within a very short time and at the same time are heated to a proper temperature to mix well with the warm bituminous cement. The next step in the process of preparing a pavement mixture by this means is the delivery of the proper quantity of bituminous cement into the drum. Before this is done, however, the flame is preferably extinguished or so reduced as to prevent the ignition of the bituminous cement. The cement having been fed into the drum while the rotation of the drum still continues so that the feeding of the stone is still going on, the bituminous cement and the hot stones are thoroughly intermingled, the stones being passed from one end to the other of the drum and returned as above described. After a thorough mixture has been had the trough $P^2$ is lifted and held or supported in any convenient way within the drum so as to receive the contents of the various trays $L^2$ as the drum rotates and delivers such contents into the cart or other receptacle. When the drum has once been emptied it is ready to receive a fresh charge of stone to be heated and later mixed with bituminous cement.

While I have described the best form of my invention known to me I do not mean to limit myself to the exact construction shown. It will be clear to any mechanic that other means of rotating a drum may be provided and other feeding means for a mineral aggregate from one end of the drum to the other may also be used. So far as I know, however, heretofore there has never been a mixing plant, whether for pavement uses or other purposes, in which the mixture has been conveyed in an unobstructed path from one end to the other of the mixing machine and then returned automatically to its place of starting so that the materials are being constantly moved in a direction lengthwise of the mixer thus having a longitudinal line of travel from one end of the mixer to the other and back again so long as the mixer is in operation, nor has such an arrangement been used in connection with a drying heat. Thus so long as the drum is rotated, there is a constant circulation of material from one end of the drum to the other and back again, in distinction from a mere stirring up of the material. By thus circulating the material, all particles of it in turn are brought under the same drying and heating conditions and hence are uniformly treated.

The exact means shown of applying power to the drum and other parts need not be followed as other means may be used in a machine embodying my invention, my invention relating especially to a mixer in which the material is fed automatically and at the same time intermixed and returned to the point of starting, which structure is I believe new with me.

While I have described the use of this machine in preparing a mixture of stone and bituminous cement it will be understood by those skilled in the art that it is as well adapted to mix Portland cement concrete or the like.

What I claim as my invention is:—

1. In a concrete mixer, a drum, means attached thereto to move the contents thereof in one direction, and means operating independently of said drum to move its contents in the opposite direction, and means located at each end of said drum for delivering the contents of each contents-moving means to the other, whereby the contents of said drum are moved repeatedly from one end to the other of said drum and back again.

2. In a concrete mixer, a drum, means for rotating it, means attached to the periphery of its interior whereby the contents of the drum will be fed positively in one direction from end to end thereof, and means operating independently thereof for feeding said contents in the opposite direction, and means located at each end of the drum whereby the contents of each feeding means will be delivered to the other feeding means.

3. In a concrete mixer, a drum, means for rotating it, means attached to the periphery of its interior whereby the contents of the drum will be fed positively in one direction from end to end thereof, means operating independently thereof for feeding said contents in the opposite direction, and means located at each end of said drum whereby the contents of each feeding means will be delivered to the other feeding means in combination with means adapted to feed material to said periphery-attached means, and means adapted to be temporarily inserted in said drum to receive material from said periphery-attached means and discharge it outside of said drum, as set forth.

4. In a concrete mixer, a drum, means whereby the contents of said drum will be fed positively from end to end thereof in one direction, means whereby the said contents may be fed positively from end to end of the drum in the opposite direction, and two means one located at each end of the drum, each adapted to receive said contents from one feeding means and deliver it to the other feeding means.

5. In a concrete mixer, a drum, means for rotating it, means attached to the interior of its periphery whereby the contents of the drum will be fed positively in one direction from end to end thereof, means operating independently thereof for feeding said contents in the opposite direction, means for delivering the contents of each of said feeding means to the other whereby the same material may be fed from end to end of the drum repeatedly, and means for stopping the said repeated feeding of the said material comprising a chute adapted to be introduced into said drum to receive the material from one of said feeding means and deliver it outside of the drum.

6. In a concrete mixer, a drum, a spiral conveyer attached to its interior peripheral surface, and a second spiral conveyer located at substantially the axis of said first named conveyer, means for transferring material conveyed by said first named conveyer to said second conveyer, and means whereby said drum and said second conveyer are rotated in opposite directions.

7. In a concrete mixer, a drum, a spiral conveyer attached to the interior peripheral surface thereof, a second spiral conveyer located at the axis of said drum, a trough located below it to coöperate with it, and a series of trays located at one end of the drum to receive material from said first named conveyer and deliver it to said second conveyer.

8. In a concrete mixer, in combination, a drum, means for rotating said drum, means for positively feeding its contents from end to end in one direction, and means for positively feeding its contents from end to end in the opposite direction, means located at each end of said drum for delivering the contents of each of said feeding means to the other, whereby said material may be fed from end to end of the drum repeatedly, means for supplying heat to the interior of the drum, and means movable into the drum adapted to receive the contents of the drum and discharge said contents outside of said drum.

HORACE W. ASH.

Witnesses:
M. E. FLAHERTY,
GEORGE DANGTON.